(12) United States Patent
Zhang

(10) Patent No.: US 10,260,115 B2
(45) Date of Patent: Apr. 16, 2019

(54) LEATHER PRODUCTION USING WASTE LIQUIDS

(71) Applicant: Zhuangdou Zhang, Shangqiu (CN)

(72) Inventor: Zhuangdou Zhang, Shangqiu (CN)

(*) Notice: Subject to any disclaimer, the term of this patent is extended or adjusted under 35 U.S.C. 154(b) by 139 days.

(21) Appl. No.: 15/347,755

(22) Filed: Nov. 9, 2016

(65) Prior Publication Data

US 2017/0233833 A1   Aug. 17, 2017

Related U.S. Application Data

(63) Continuation-in-part of application No. 14/220,871, filed on Mar. 20, 2014, now Pat. No. 9,776,887.

(30) Foreign Application Priority Data

Nov. 25, 2015 (CN) .......................... 2015 1 0826825

(51) Int. Cl.
   *C14C 3/32* (2006.01)
   *C14C 3/00* (2006.01)
   (Continued)

(52) U.S. Cl.
   CPC .............. *C14C 3/32* (2013.01); *C02F 1/004* (2013.01); *C14C 1/00* (2013.01); *C14C 1/04* (2013.01); *C14C 1/06* (2013.01); *C14C 1/065* (2013.01); *C14C 1/08* (2013.01); *C14C 3/06* (2013.01); *C14C 3/16* (2013.01); *C14C 3/22* (2013.01); *C14C 3/28* (2013.01); *C14C 5/00* (2013.01); *C14C 9/02* (2013.01); *D06P 3/32* (2013.01); *C02F 2103/24* (2013.01); *C02F 2301/046* (2013.01)

(58) Field of Classification Search
   CPC ... C02F 1/004; C14C 1/04; C14C 1/08; C14C 3/06; C14C 3/22; C14C 3/28; C14C 3/32; C14C 9/02

USPC ............................................. 8/94.27; 210/70
See application file for complete search history.

(56) References Cited

U.S. PATENT DOCUMENTS

| 3,950,131 A | 4/1976 | Young |
| 4,457,759 A * | 7/1984 | Fekete ...................... C14C 1/06 8/94.16 |
| 2013/0206692 A1 | 8/2013 | Zhang |

FOREIGN PATENT DOCUMENTS

| AU | 2014202826 A1 | 6/2015 |
| AU | 2015271965 A1 | 7/2016 |

(Continued)

OTHER PUBLICATIONS

The World Bank Group, 'Pollution Prevention and Abatement Handbook 1998—Tanning and Leather Finishing', World Bank Publications, Washington, 1999, ISBN 0-8213-3638-X, pp. 404 to 407.

(Continued)

*Primary Examiner* — Robert A Hopkins
(74) *Attorney, Agent, or Firm* — Corridor Law Group, P.C.

(57) ABSTRACT

A process for leather production from a raw animal hide includes the steps of pre-soaking, soaking, unhairing and liming, re-liming, deliming and bating, pickling and tanning, degreasing, re-tanning, neutralizing, dyeing and fatliquoring, and washing the processed hide. Waste liquid is collected from at least one of the foregoing steps is recycled to at least one of the foregoing steps. The collected waste liquid can be recycled to the same step, to a different step, or to two of more steps in the process.

1 Claim, 1 Drawing Sheet

(51) Int. Cl.
*C02F 1/00* (2006.01)
*C14C 1/06* (2006.01)
*C14C 1/08* (2006.01)
*C14C 1/04* (2006.01)
*C14C 5/00* (2006.01)
*C14C 9/02* (2006.01)
*D06P 3/32* (2006.01)
*C14C 3/16* (2006.01)
*C14C 3/06* (2006.01)
*C14C 1/00* (2006.01)
*C14C 3/22* (2006.01)
*C14C 3/28* (2006.01)
*C02F 103/24* (2006.01)

(56) References Cited

FOREIGN PATENT DOCUMENTS

| CN | 101921881 B | 12/2010 |
|---|---|---|
| CN | 102120664 A | 7/2011 |
| CN | 102534056 A | 7/2012 |
| CN | 103663765 A | 3/2014 |
| CN | 103833155 A | 6/2014 |
| CN | 104004866 A | 8/2014 |
| CN | 204385217 U | 6/2015 |
| CN | 104988251 A | 10/2015 |
| DE | 4413895 A1 | 10/1995 |
| DE | 19529404 A1 | 2/1997 |
| EP | 0637570 A1 | 2/1995 |
| EP | 2881369 A1 | 6/2015 |
| EP | 3045548 A2 | 7/2016 |
| WO | 2002036497 A1 | 5/2002 |
| WO | 2014169564 A1 | 10/2014 |

OTHER PUBLICATIONS

Orts, M R et al, Tannery Wastewater Recycling in Leather Industries, Project LIFE 00 ENV/E/000498; published Aug. 2, 2003 as per Wayback Machine.
Further Examination report dated Jan. 12, 2015 in connection with New Zealand Patent Application No. 626503.
Partial European Search Report dated May 24, 2016 in connection with European Patent Application No. 15003637.4.
Office Action dated Dec. 7, 2016 in connection with U.S. Appl. No. 14/220,871.
Extended European Search Report dated May 2, 2017 in connection to European Application No. 16002435.2-1302.
Office Action dated May 11, 2017 in connection to Australian Application No. 2016259344.
Office Action dated Nov. 9, 2017 in connection to European Application No. 14002106.4-1371.
Probiotics as alternatives for synthetic soaking auxiliaries for raw hides and skins in tanneries. https://www.subsport.eu/case-stories/419-en; published Oct. 17, 2016.
Examination Report No. 2 dated May 7, 2018 in connection to Australian Application No. 2016259344.
Cassano et al. : "Recovery and reuse of chemicals in unhairing, degreasing and chromium tanning processes by membranes", Desalination, Elsevier, Amsterdam, NI, vol. 113, No. 2-3, Nov. 30, 1997, pp. 251-261.
Scholz et al. : "Techno-economic evaluation of membrane filtration for the recovery and re-use of tanning chemicals", Water Research, Elsevier, Amsterdam, NI, vol. 37, No. 8, Apr. 1, 2003, pp. 1859-1867.
Zhang et al., "Recycling of Wastewater from Raw Hide to Wet Blues in Leather Manufacture", Congress of the International Union of Leather Technologists & Chemists Societies, Oct. 11, 2009.
First Examination Report dated Jun. 27, 2014 in connection with New Zealand Patent Application No. 626503.
Extended European Search Report dated Sep. 26, 2014 in connection with European Patent Application No. 14002106.4.
Further Examination report dated Jun. 18, 2015 in connection with New Zealand Patent Application No. 626503.
Patent Examination Report No. 1 dated Mar. 19, 2015 in connection with Australian Patent Application No. 2014202826.
European Office Action dated Jan. 19, 2016 in connection with European Patent Application No. 14002106.4.
First Examination Report dated Aug. 30, 2016 in connection with Australian Patent Application No. 2015271965.
Extended European Search Report dated Dec. 9, 2016 in connection with European Patent Application 15003637.4.

* cited by examiner

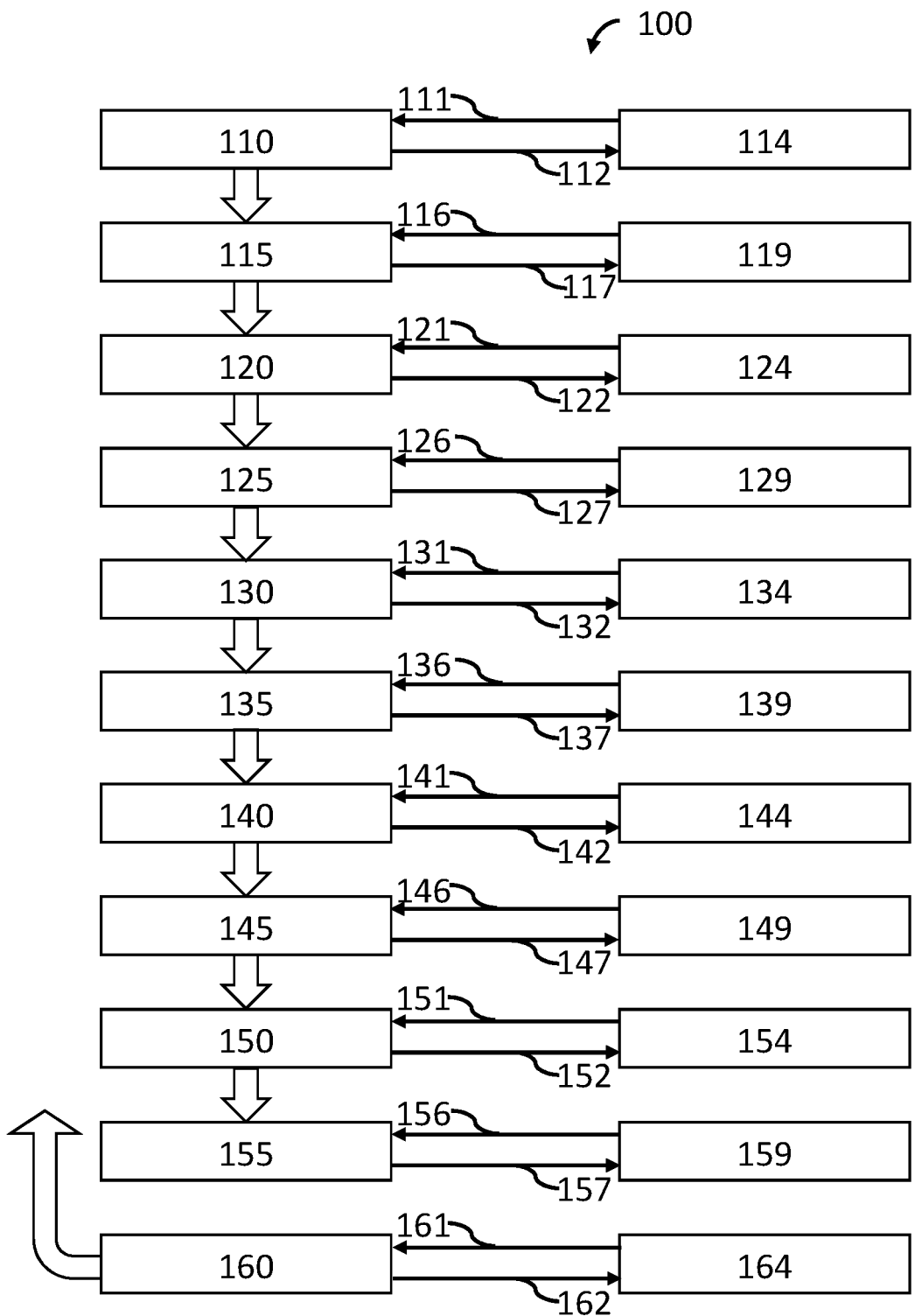

LEATHER PRODUCTION USING WASTE LIQUIDS

CROSS-REFERENCE TO RELATED APPLICATION

The present application is a continuation-in-part of U.S. patent application Ser. No. 14/220,871 filed on Mar. 20, 2014, entitled "Tannery Process With Effluent Recycling". The '871 application claimed priority benefits, in turn, from Chinese patent application No. 201310689868.2 having a filing date of Dec. 23, 2013, and from Chinese patent application No. 201410051333.7 having a filing date of Feb. 17, 2014.

This application is related to and claims priority benefits from Chinese patent application No. 201510826825.3 filed on Nov. 25, 2015, which is hereby incorporated by reference in its entirety.

FIELD OF THE INVENTION

The present invention relates to the technical field of leather production with waste liquids in the tanning industry.

BACKGROUND OF THE INVENTION

During tanning production processes, large quantities of waste liquids and waste solids are produced, which contain plentiful lime, salts, oil and grease, ammonia and other nitrogen compounds, proteins, sulfides, chromates, dyes, hairs, leather residues, silts, and other waste products. The wastes have very high chemical oxygen demand (COD) and biochemical oxygen demand (BOD), high variation coefficients and a stench. These industrial wastes are difficult to treat and generate serious contamination to the environment.

As society is setting higher standards for environmental protection, how to treat tanning waste liquids has become a difficult issue that must be addressed by the industry. To solve this difficult problem, through many years of research and development, and commercial applications, it has been found that the waste liquids are actually valuable and can be reused since they contain a lot of beneficial ingredients. Making leather with waste liquids can produce leather with quality superior to those made from conventional processes that use fresh water. Enzymes and decomposition products in the waste liquids are all beneficial for leather production. For example, amino acids and saponified substances are beneficial for filling collagen fibers and enable the waste liquids to maintain a stable state. The present process takes advantage of the beneficial properties of waste liquids to produce leather using waste liquids. The present process effectively solves environmental protection issues for the tanning industry, and improves product quality. This new process provides the tanning industry with both economic and environmental benefits.

In the tanning industry, the terms "hide" and "skin" are oftentimes used interchangeably, each referring to the integument or natural covering of an animal. Since the term "hide" is most often associated with larger animals such as cows or bison, the term "hide" will be used hereinafter. It should be understood, however, that the process for the production of leather described and claimed herein can be applied equivalently to animal skin as well as animal hide.

SUMMARY OF THE INVENTION

A process for producing leather uses waste liquids that are repeatedly employed to produce improved leather products. A waste liquid is employed in one or more of the steps of the process. Combinations of waste liquids can be employed in one or more of the steps of the process.

The present process for producing leather using waste liquids comprises at least one of the following steps:

(1) A pre-soaking step in which liquid waste and chemicals ordinarily added are used. Liquid waste is collected at the end of this step. The pre-soaking step employs at least one of a soaking agent, a bactericide, a degreasing agent, salt or an alkali.

(2) A soaking step in which liquid waste and chemicals ordinarily added are used to restore dry skins to freshness and remove soluble proteins and grease from raw skins. The soaking step employs at least one of a soaking agent, an enzyme, a bactericide, a degreasing agent, salt or an alkali. Liquid waste is collected at the end of this step.

(3) An unhairing and liming step in which liquid waste and chemicals ordinarily added are used to remove hairs from skins and filter out the hairs. The unhairing and liming step employs at least one of a liming agent, an enzyme, lime, a lime dispersant, sodium hydrosulfide, sodium sulfide, a degreasing agent, salt or an alkali to remove hair from the hide. Liquid waste is collected at the end of this step.

(4) A re-liming step in which liquid waste and chemicals ordinarily added are used. The re-liming step employs at least one of a liming agent, an enzyme, lime, a lime dispersant, sodium hydrosulfide, sodium sulfide, a degreasing agent or an alkali. Liquid waste collected at the end of this step.

(5) A deliming and bating step in which liquid waste and chemicals ordinarily added are used. The deliming and bating step employs at least one of a deliming agent, an enzyme, a lime dispersant, a degreasing agent, ammonium sulfate or an acid. Liquid waste is collected at the end of this step.

(6) A pickling and tanning step in which liquid waste and chemicals ordinarily added are used. The pickling and tanning step employs at least one of a degreasing agent, salt, a fungicide, an acid, a fatliquoring agent, a cross-linking agent, chrome powder, a basifying agent or sodium formate. Liquid waste is collected at the end of this step.

(7) A degreasing step in which liquid waste and chemicals ordinarily added are used. The degreasing step employs at least one of a degreasing agent, formic acid or oxalic acid. Liquid waste is collected at the end of this step.

(8) A re-tanning process in which liquid waste and chemicals ordinarily added are used. The re-tanning step employs at least one of chrome powder, a tanning agent, a protein filling agent, an aliphatic aldehyde or an acrylic resin tanning agent. Liquid waste is collected at the end of this step.

(9) A neutralizing step in which liquid waste and chemicals ordinarily added are used. The neutralizing step employs at least one of a neutralizing agent, sodium formate, calcium formate, sodium bicarbonate or ammonium sulfate. Liquid waste is collected at the end of this step.

(10) A dyeing and fatliquoring step in which liquid waste and chemicals ordinarily added are used. The dyeing and fatliquoring step employs at least one of melamine, dicyanodiamide, a syntan, a vegetable tanning agent, a synthetic fatliquoring agent, a sulfited fatliquor, a sulfated fatliquor, a cationic fatliquor, neatsfoot oil or lecithin. Liquid waste is collected at the end of this step.

(11) A water washing step in which liquid waste remaining in the drum is used.

The liquid waste referred to in the foregoing steps is generated by each individual step, namely, pre-soaking, soaking, unhairing, liming, re-liming, deliming, bating, pickling, tanning, degreasing, re-tanning, neutralizing, dyeing, fatliquoring and water washing steps, or a combination of two or more steps.

In operation, liquid waste is recycled at least once in the foregoing process.

In the process of leather production with waste liquids, the combination of some steps does not substantially affect the efficacy of the process.

In the process of leather production with waste liquids, the filtration of a waste liquid does not substantially affect the efficacy of the process.

In the process of leather production with waste liquids, the precipitation of a waste liquid does not substantially affect the efficacy of the process.

In the process of leather production with waste liquids, the pressurization of a waste liquid does not substantially affect the efficacy of the process.

In the process of leather production with waste liquids, the aeration of a waste liquid does not substantially affect the efficacy of the process.

In the process of leather production with waste liquids, the stirring of a waste liquid does not substantially affect the efficacy of the process.

In the process of leather production with waste liquids, the chemical treatment of a waste liquid does not substantially affect the efficacy of the process.

In the process of leather production with waste liquids, the biological treatment of a waste liquid does not substantially affect the efficacy of the process.

In the process of leather production with waste liquids, the combined use of a waste liquid and fresh water does not substantially affect the efficacy of the process.

The waste liquids contain plentiful ingredients that are favorable for leather production, such as lime, deliming agents, soaking agents, liming agents, sulfides, acids, enzymes, tanning agents, saponified substances, and amino acids. For example, amino acids and saponified substances can be used to fill collagen fibers, which can improve the quality of finished products.

In the process of leather production with waste liquids, if the waste liquids are treated with procedures such as filtration, precipitation, compression, stirring, aeration, chemical treatment and biological methods, these procedures will likely change the composition of the waste liquids. Therefore, a step would need to be adjusted accordingly when a treated waste liquid is used.

The original waste liquids used in the present process are generated from pre-soaking, soaking, unhairing, liming, re-liming, deliming, bating, pickling, tanning, degreasing, re-tanning, neutralizing, dyeing, fatliquoring and water washing procedures, or some of these steps. Typically, waste liquids from pre-soaking and soaking contain soaking agents, NaCl, $Na_2CO_3$, degreasing agents, saponified substances, hair, keratin, and mucins. With respect to the residual contents in these waste liquids, the degreasing agents are typically 15% to 30% of the original amount, 10% to 40% for soaking agents, and 20% to 50% for $Na_2CO_3$. Waste liquids from unhairing, liming and re-liming procedures contain saponified substances, salts, lime, liming agents, $S^{2-}$, $OH^-$, $Na^+$, $Ca^{2+}$, amino acids, enzymes and amines. With respect to the residual contents in these waste liquids, the residual content of lime is typically 30% to 65% of the original amount, and the residual content of sulfides is typically 0.1 to 8.0 g/L. Waste liquids from deliming and bating contain amino acids, deliming agents, degreasing agents, saponified substances, enzymes, ammonium salts and amines. The residual content of enzymes is typically 20% to 50% of the original amount, and the residual content of ammonium salts is typically 20% to 40% of the original amount. Tanning waste liquids contain tanning agents, salts, amino acids, and saponified substances. The residual content of $Cr^{3+}$ is typically 2.0 to 3.5 g/L, and $Cl^-$ is typically 5.0 to 15 g/L. Waste liquids from degreasing and re-tanning contain $Na^+$, $Cr^{3+}$ and tanning agents. Neutralizing waste liquids contain neutral salts and the like. Waste liquids from fatliquoring and dyeing contain chemical materials such as fatliquoring agents, dyes and auxiliary dyeing agents. If these waste liquids are discharged freely, these waste liquids will not only cause significant contamination to the environment, but will also result in a great waste of resources.

The present process substantially overcomes the contamination problems in the tanning industry, simplifies the tanning process, significantly reduces the discharge of tanning waste liquids and solid wastes, saves water, conserves land use for environmental protection, lowers required investments in environmental protection facilities, reduces the use of chemical preparations for environmental protection, and lowers human costs for environmental protection, saves on the use of chemical materials in the tanning process, and improves product quality.

BRIEF DESCRIPTION OF THE DRAWINGS

FIG. 1 is a flow diagram of the process for producing leather with waste liquids.

DETAILED DESCRIPTION OF ILLUSTRATIVE EMBODIMENT(S)

The present process will be further described below with reference to FIG. 1 and the following examples.

Example 1

Soaking Step

As shown in FIG. 1, in a soaking step, relative to the weight of raw hide, the following components are added to a drum containing the raw hide: 160% waste liquid collected from a previously performed soaking step, 0.24% ELIPO-S (tradename for a composition comprising sodium dimethyldithiocarbonate, sodium hexametaphosphate and polyphosphoric acid sodium salt; available from Biosk (SQ) Chemicals Co., Limited, No. 6 Changjiang East Road, Shangqiu Development Zone, Henan, China), 0.35% bactericide, 0.5% soaking agent, 0.25% degreasing agent, 0.4% soda ash, and 0.2% soaking enzyme. The drum is then rotated for 120 min. at a temperature of 22° C. The drum is then rotated for 15 min. every hour, for 12 hours, with the rotation then stopped for 45 min. before repeating this rotate/stop sequence each overnight hour. On the second day, the drum is rotated continuously for 20 min., and the soaking step then ends.

Example 2

Unhairing and Liming Step

As shown in FIG. 1, in an unhairing and liming step, relative to the weight of soaked hide, the following components are added to the drum containing the raw hide: 120% waste liquid collected from a previously performed unhairing and liming step, 0.20% ELIPO-L (tradename for another composition comprising sodium dimethyldithiocarbonate, sodium hexametaphosphate and polyphosphoric acid sodium salt; available from Biosk (SQ) Chemicals Co., Limited), and 2.5% liming agent DO-PRO (tradename for a composition comprising sodium silicate and dimethyl sulfoxide; available from Biosk (SQ) Chemicals Co., Limited). The drum is then rotated for 30 min. at a temperature of 15° C. 2.5% lime is then added to the drum, and the drum is then rotated for 20 min. and then stopped for 20 min. 1.2% sodium sulfide is then added to the drum and the drum is rotated for 50 min. The hair is then filtered for 150 min. The following components are then added to the drum: 0.3% sodium sulfide, 0.1% NaHS, and 0.2% lime. The drum is then rotated for 20 min., stopped for 20 min., and the rotate/stop sequence is repeated one more time. The following components are then added to the drum: 20% waste liquid collected from a previously performed unhairing and liming step, 0.03% ELIPO-L, 0.2% sodium sulfide, 0.3% lime, 0.4% liming agent DO-PRO. The drum is then rotated for 10 min., stopped for 20 min., and this rotate/stop sequence is repeated five more times. The following components are then added to the drum: 65% waste liquid collected from a previously performed unhairing and liming step, 0.10% ELIPO-L, and 0.05% liming enzyme. The drum is then rotated for 5 min. The drum is then rotated for 15 min. every hour for 12 hours, with the rotation then stopped for 45 min. before repeating this rotate/stop sequence each overnight hour. On the second day, the drum is rotated continuously for 30 min., and the unhairing and liming step then ends.

Example 3

Re-Liming Step

As shown in FIG. 1, in a re-liming step, relative to the weight of unhaired and limed hide, the following components are added to the drum: 180% waste liquid collected from a previously performed re-liming step, 0.27% ELIPO-L. The drum is then rotated for 5 min. The following components are then added to the drum: 1.0% lime and 1.5% liming agent DO-PRO. The drum is then rotated for 10 min., and then rotated for 2 min. and stopped for 58 min., and this rotate/stop sequence is repeated four more times. The re-liming step then ends.

Example 4

Deliming and Bating Step

As shown in FIG. 1, in a deliming and bating step, relative to the weight of limed hide, the following components are added to the drum: 80% waste liquid collected from a previously performed deliming and bating step, 0.12% ELIPO-L, 0.2% degreasing agent and 1.5% deliming agent. The drum is then rotated for 30 min. 0.1% bating enzyme is then added to the drum, and the drum is then rotated for 30 min. The deliming and bating step then ends.

Example 5

Degreasing Step

The hide is shaved between the pickling and tanning step and the present degreasing step. As shown in FIG. 1, in the degreasing step, relative to the weight of shaved hide, 200% waste liquid collected from a previously performed degreasing step and 0.3% ELIPO-L are added to the drum. The drum is then rotated for 10 min. at a temperature of 40° C. 0.3% degreasing agent and 0.3% oxalic acid are then added to the drum, and the drum is then rotated for 60 min. The degreasing step then ends.

Example 6

Re-tanning Step

As shown in FIG. 1, in a re-tanning step, relative to the weight of shaved hide, the following components are added to a drum: 150% waste liquid collected from a previously performed re-tanning step, 0.22% ELIPO-L and 0.3% formic acid are added to the drum. The drum is then rotated for 10 min. at a temperature of 25° C. 1.0% aliphatic aldehyde is then added to the drum, and the drum is then rotated for 30 min. The following components are then added to the drum: 2.0% chromium powder, 1.5% re-tanning agent, and the drum is then rotated for 60 min. 1.0% sodium formate is then added to the drum, and the drum is then rotated for 20 min. 0.2% baking soda and 0.3% liming agent DO-PRO are then added to the drum, and the drum is then rotated for 60 min. The drum is stopped for 8 hours. On the second day, the drum is rotated for 20 min. The re-tanning step then ends.

Example 7

Neutralizing Step

As shown in FIG. 1, in a neutralizing step, relative to the weight of shaved hide, the following components are added to the drum: 180% waste liquid collected from a previously performed neutralizing step, 0.27% ELIPO-L, 2.0% neutralizing agent, and 1.5% sodium formate. The drum is then rotated for 30 min. 0.3% liming agent DO-PRO and 0.5% softening agent are then added to the drum, and the drum is then rotated for 60 min. The neutralizing step then ends.

Example 8

Dyeing and Fatliquoring Step

As shown in FIG. 1, in a dyeing and fatliquoring step, relative to the weight of shaved hide, the following components are added to the drum: 50% waste liquid collected from a previously performed dyeing and fatliquoring step, 0.08% ELIPO-L, 2.0% acrylic acid re-tanning agent, and 2.0% filler (bulking agent). The drum is then rotated for 30 min. at a temperature of 35° C. The following components are then added to the drum: 3.5% cyanoguanidine re-tanning agent, 1.5% superlight synthetic filler, 4.0% mimosa extract, 2.0% displacement tannin, and 2.0% dye. The drum is then rotated for 80 min. 150% waste liquid and 0.23% ELIPO-L are then added to the drum, and the drum is then rotated for 10 min. at a temperature of 50° C. The following components are then added to the drum: 2.5% compound fatliquoring agent, 2.5% lecithin, 1.5% synthetic fatliquoring agent, 0.5% neatsfoot oil. The drum is then rotated for 60 min. 1.5% acetic acid and 1.0% formic acid are then added to the drum in three batches, with each batch added 20 min. apart. The dyeing and fatliquoring step then ends.

Example 9

Pre-Soaking Step

As shown in FIG. 1, in a pre-soaking step, relative to the weight of raw hide, 150% waste liquid collected from a previously performed deliming and bating step is added to the drum, as well as 0.15% ELIPO-S, 0.3% bactericide, 0.2% soaking agent, 0.2% degreasing agent, 0.3% soda ash (sodium carbonate). The drum is then rotated for 180 min. at a temperature of 22° C. The pre-soaking step then ends.

Example 10

Unhairing and Liming Step

As shown in FIG. 1, in an unhairing and liming step, relative to the weight of raw hide, 60% waste liquid collected from a previously performed soaking step and 1.5% liming agent DO-PRO are added to the drum, and the drum is then rotated for 30 min. The following components are then added to the drum: 1.8% lime, 20% waste liquid collected from a previously performed liming step, and 0.1% ELIPO-L. The drum is then rotated for 10 min. 1.2% $Na_2S$ is then added to the drum, and the drum is then rotated for 20 min. 30% waste liquid collected from a previously performed liming step and 0.05% ELIPO-L, and the hair is then filtered for 120 min. The following components are then added to the drum: 0.75% sodium sulfide, 0.3% NaHS, and 1.0% lime are then added to the drum. The drum is then, rotated for 20 min., stopped for 20 min., and this rotate/stop sequence is then repeated one more time. The following components are then added to the drum: 20% waste liquid collected from a previously performed liming step, 0.03% ELIPO-L, 0.2% sodium sulfide, 0.8% lime, and 0.8% liming agent DO-PRO. The drum is then rotated for 10 min., stopped for 20 min., and this rotate/stop sequence is then repeated five more times. The following components are then added to the drum: 65% waste liquid collected from a previously performed liming step, 0.15% ELIPO-L, and 0.1% liming enzyme. The drum is then rotated for 5 min. The drum is then rotated for 15 min. every hour for 13 hours, with the rotation then stopped for 45 min. before repeating this rotate/stop sequence each overnight hour. The unhairing and liming step then ends.

Example 11

Re-Liming Step

As shown in FIG. 1, in a re-liming step, relative to the weight of limed hide, 120% waste liquid collected from a previously performed liming and re-liming step [please confirm] and 0.15% ELIPO-L are added to the drum. The drum is then rotated for 5 min. 0.4% liming agent DO-PRO is then added to the drum, and the drum is then rotated for 10 min. The drum is then rotated for 2 min., stopped for 58 min., and this rotate/stop sequence is then repeated three more times. The re-liming step then ends.

Example 12

Pickling and Tanning Step

As shown in FIG. 1, in a pickling and tanning step, relative to the weight of limed hide, the following components are added to the drum: 50% waste liquid collected from a previously performed deliming and bating step, 0.1% ELIPO-L, 0.3% fungicide, and 0.5% salts. The drum is then rotated for 10 min. 0.5% formic acid is then added to the drum, and the drum is then rotated for 10 min. 1.8% sulfuric acid is then added to the drum, and the drum is then rotated for 90 min. 1.0% sodium formate is then added to the drum, and the drum is rotated for 30 min. 2.5% chromium powder is then added to the drum, and the drum is then rotated for 30 min. 2.0% chromium powder is then added to the drum, and the drum is then rotated for 60 min. 0.2% ELIPO-L is then added to the drum, and the drum is then rotated for 30 min. 0.3% basifying agent is then added to the drum, and the drum is then rotated for 4 hr. 80% waste liquid collected from a previously performed pickling and tanning step and 0.12% ELIPO-L are then added to the drum, and the drum is then rotated for 5 hr. at a temperature of 40° C. The pickling and tanning step then ends.

Example 13

Degreasing Step

As shown in FIG. 1, in a degreasing step, relative to the weight of shaved, the following components are added to the drum: 80% fresh water, 120% waste liquid collected from a previously performed degreasing step and 0.1% ELIPO-L. The drum is then rotated for 10 min. at a temperature of 40° C. The following components are then added to the drum: 0.1% degreasing agent, 0.2% liming agent DO-PRO, and 0.15% formic acid. The drum is then rotated for 60 min. The degreasing step then ends.

Example 14

Re-Tanning Step

As shown in FIG. 1, in a re-tanning step, relative to the weight of shaved, the following components are added to the drum: 100% fresh water, 100% waste liquid collected from a previously performed re-tanning step, 0.15% ELIPO-L, and 0.5% formic acid. The drum is then rotated for 10 min. at a temperature of 35° C. 3.5% chromium powder and 1.0% re-tanning agent are then added to the drum, and the drum is rotated for 60 min. 1.0% aliphatic aldehyde and 1.0% sodium formate are then added to the drum, and the drum is then rotated for 20 min. 0.3% baking soda and 0.2% liming agent DO-PRO are then added to the drum. The drum is then rotated for 60 min. The drum is then stopped for 10 hours. On the second day, the drum is rotated for 20 min. The re-tanning step then ends.

Example 15

Neutralizing Step

As shown in FIG. 1, in a neutralizing step, relative to the weight of shaved, the following components are added to the drum: 100% fresh water, 100% waste liquid collected from a previously performed neutralizing step, 0.3% ELIPO-L, 2.0% neutralizing tannin, 1.0% sodium formate, and 0.2% liming agent DO-PRO. The drum is then rotated for 40 min at a temperature of 32° C. 0.3% baking soda is then added to the drum, and the drum is then rotated for 60 min. The neutralizing step then ends.

Example 16

Dyeing and Fatliquoring Step

As shown in FIG. 1, in a dyeing and fatliquoring step, relative to the weight of shaved hide, the following components are added to the drum: 20% fresh water, 30% waste liquid collected from a previously performed dyeing and fatliquoring step, 0.05% ELIPO-L, 2.0% acrylic acid re-tanning agent, and 2.0% filler (bulking agent). The drum is then rotated for 30 min. at a temperature of 30° C. The following components are then added to the drum: 4.5% cyanoguanidine re-tanning agent, 1.5% superlight synthetic filler, 4.0% mimosa extract, 2.0% displacement tannin, and 2.0% black dye. The drum is then rotated for 80 min. The following components are then added to the drum: 100% waste liquid collected from a previously performed dyeing and fatliquoring step, 50% fresh water, and 0.45% ELIPO. The drum is then rotated for 10 min. at a temperature of 50° C. The following components are then added to the drum: 2.8% compound fatliquoring agent, 2.8% lecithin, 1.5% synthetic fatliquoring agent, and 0.5% neatsfoot oil. The drum is then rotated for 60 min. 1.2% acetic acid and 1.0% formic acid are then added to the drum in three batches, with each batch added 20 min. apart The dyeing and fatliquoring step then ends.

Most of the chemical materials used in the above examples are available from Biosk (SQ) Chemicals Co., Limited, including ELIPO-L, ELIPO-S and DO-PRO.

FIG. 1 is an overview of a leather production process 100 employing recycling. As shown in process 100 of FIG. 1, there can be a pre-soaking step 110, wherein liquid waste 114 is collected in a reservoir, vessel, container, or drum at step 112 (in any of the forgoing steps, a "drum" can be any type of vessel for capturing the referenced material). At step 111, this liquid waste is employed in future pre-soaking steps or other steps. Process 100 can comprise a soaking step 115, in which liquid waste 119 is collected in a vessel during step 117, and employed in future soaking or other steps in step 116. Process 100 can comprise an unhairing and liming step 120, in which liquid waste 124 is collected in a vessel during step 122, and employed in future unhairing and liming or other steps in step 121. Process 100 can comprise a re-liming step 125, in which liquid waste 129 is collected in a vessel during step 127, and employed in future unhairing and liming or other steps in step 126.

Process 100 can comprise a deliming and bating step 130, in which liquid waste 134 is collected in a vessel during step 132, and employed in future deliming and bating or other steps in step 131. Process 100 can comprise a pickling and tanning step 135, in which liquid waste 139 is collected in a vessel during step 137, and employed in future pickling and tanning or other steps in step 136. Process 100 can comprise a degreasing step 140, in which liquid waste 144 is collected in a vessel during step 142, and employed in future degreasing or other steps in step 141. Process 100 can comprise a re-tanning step 145, in which liquid waste 149 is collected in a vessel during step 147, and employed in future re-tanning or other steps in step 146.

Process 100 can comprise a neutralizing step 150, in which liquid waste 154 is collected in a vessel during step 152, and employed in future neutralizing or other steps in step 151. Process 100 can comprise a dyeing and fatliquoring step 155, in which liquid waste 159 is collected in a vessel during step 157, and employed in future dyeing and fatliquoring or other steps in step 156.

In some embodiments, a washing step 160 of process 100 in FIG. 1 is present, wherein the hide is washed with water. In some embodiments, the waste liquid from washing is collected, and in some embodiments the liquid waste of other steps in process 100 is used in washing step 160. Liquid waste 164 is collected in a vessel at step 162, and is employed in future washing steps at 161. In some embodiments, the liquid waste is employed in other steps. Depending on the chosen embodiment, a washing step 160 can be performed at different points of processes 100. In some embodiments, a washing step can be performed multiple times during process 100.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A process for the production of leather from a quantity of hide, the process comprising at least one of the following steps (a)-(j):

(a) a pre-soaking step producing a pre-soaking waste liquid effluent, said pre-soaking waste liquid effluent collected and recycled for use in the pre-soaking step performed on a subsequent quantity of hide;

(b) a soaking step producing a soaking waste liquid effluent, said soaking waste liquid effluent collected and recycled for use in the soaking step performed on a subsequent quantity of hide;

(c) an unhairing and liming step producing an unhairing and liming waste liquid effluent, said unhairing and liming waste liquid effluent collected and recycled for use in the unhairing and liming step performed on a subsequent quantity of hide;

(d) a re-liming step producing a re-liming waste liquid effluent, said re-liming waste liquid effluent collected and recycled for use in the re-liming step performed on a subsequent quantity of hide;

(e) a deliming and bating step producing a deliming and bating waste liquid effluent, said deliming and bating waste liquid effluent collected and recycled for use in the deliming and bating step performed on a subsequent quantity of hide;

(f) a pickling and tanning step producing a pickling and tanning waste liquid effluent, said pickling and tanning waste liquid effluent collected and recycled for use in the pickling and tanning step performed on a subsequent quantity of hide;

(g) a degreasing step producing a degreasing waste liquid effluent, said degreasing waste liquid effluent collected and recycled for use in the degreasing step performed on a subsequent quantity of hide;

(h) a re-tanning step producing a re-tanning waste liquid effluent, said re-tanning waste liquid effluent collected and recycled for use in a re-tanning step performed on a subsequent quantity of hide;

(i) a neutralizing step producing a neutralizing waste liquid effluent, said neutralizing waste liquid effluent collected and recycled for use in a neutralizing step performed on a subsequent quantity of hide;

(j) a dyeing and fatliquoring step producing a dyeing and fatliquoring waste liquid effluent, said dyeing and fatliquoring waste liquid effluent collected and recycled for use in a dyeing and fatliquoring step performed on a subsequent quantity of hide;

the process further comprising a washing step producing a washing waste liquid effluent, said washing waste liquid effluent collected and combined with the collected waste liquid effluent of said at least one of steps (a)-(j).

\* \* \* \* \*